US007593903B2

(12) United States Patent
Forman et al.

(10) Patent No.: US 7,593,903 B2
(45) Date of Patent: Sep. 22, 2009

(54) METHOD AND MEDIUM FOR FEATURE SELECTION OF PARTIALLY LABELED DATA

(75) Inventors: George H. Forman, Port Orchard, WA (US); Stephane Chiocchetti, Antony (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 98 days.

(21) Appl. No.: 11/004,317

(22) Filed: Dec. 3, 2004

(65) Prior Publication Data

US 2006/0179016 A1 Aug. 10, 2006

(51) Int. Cl.
G06F 15/18 (2006.01)
(52) U.S. Cl. .......................................................... 706/12
(58) Field of Classification Search .................... 706/12
See application file for complete search history.

(56) References Cited

U.S. PATENT DOCUMENTS

| 5,845,285 | A | 12/1998 | Klein |
| 6,192,360 | B1 * | 2/2001 | Dumais et al. ................. 707/6 |
| 6,701,333 | B2 | 3/2004 | Suermondt et al. |
| 6,728,689 | B1 | 4/2004 | Drissi et al. |
| 2002/0161761 | A1 | 10/2002 | Forman et al. |
| 2003/0018658 | A1 | 1/2003 | Suermondt et al. |
| 2004/0059697 | A1 | 3/2004 | Forman |
| 2004/0064464 | A1 | 4/2004 | Forman et al. |
| 2004/0093315 | A1 | 5/2004 | Carney |

OTHER PUBLICATIONS

George Forman "An Extensive Empirical Study of Feature Selection Metrics for Text Classification" The Journal of Machine Learning Research, vol. 3, Mar. 2003.*
Dunja Mladenic, Marko Grobelnik "Feature selection on hierarchy of web documents" Decision Support System 35 (2003) 45-87.*
Forman, George, H., at al., U.S. Appl. No. 11/004,318, filed on Dec. 3, 2004 (29 pages).
Abstract of Bordley, R.F. , et al., "Fuzzy Set Theory, Observer Bias and Probability Theory," *Fussy Sets Systems*, vol. 33, No. 3, 1 page (1989).
Abstract of Ejima, T., at al., "Biased Clustering Method for Partially Supervised Classification," *Proc SPIE Int Soc Opt Eng*, vol. 3304, 2 pages, (1998).
Abstract of Feelders, A.J., et al.. "Learning from Biased Data Using Mixture Models ," *KDD-96 Proceedings*, 1 page (1996).
Abstract of Hall, L.O., "Data Mining from Extreme Data Sets: Very Large and or/ Very Skewed Data Sets," *Proc IEEE Int Conf Syst Man Cybern*, vol. 1, 1 page.
Abstract of Kayacik, H.G., et al., "On Dataset Biases In a Learning System with Minimum a Priori Information for Instrusion Detection," *Proceedings on the 2nd Annual Conference on Communication Networks and Services Research*, 1 page (2004).

(Continued)

*Primary Examiner*—David R Vincent
*Assistant Examiner*—Lut Wong

(57) ABSTRACT

An apparatus and methods for feature selection are disclosed. The feature selection apparatus and methods allow for determining a set of final features corresponding to features common to features within a set of frequent features of target dataset and a plurality of features within a training dataset. The feature selection apparatus and methods also allow for removing features within a target dataset and a training dataset that are not within a set of most predictive features.

20 Claims, 6 Drawing Sheets

OTHER PUBLICATIONS

Abstract of SubbaNarasimha, P.N., et al., "Predictive Accuracy of Artificial Neural Networks and Multiple Regression in the Case of Skewed Data: Exploration of Some Issues" *Expert Systems with Applications*, vol. 19, No. 2, 1 page (2000).

Abstract of Zhu. H., et al., "Training Algorithm for Multilayer Neural Networks of Hard-Limiting Units with Random Bias" *IEICE Transactions on Fundamentals of Electronics, Communications, and Computer Science*, vol. E83-A, No. 6, 1 page (2000).

Buckley, J.J., "Training a Fuzzy Neural Net" *Proceedings of the 1994 1st International Conference of NAFIPS/IFIS/NASA*, pp. 73-77 (1994).

Ghosn, J., "Bias Learning, Knowledge Sharing," *IEEE Transactions on Neural Networks*, vol. 14, No. 4, pp. 748-765 (Jul. 2003).

Lisboa, P.J.G., et al., "Bias Reduction in Skewed Binary Classification with Bayesian Neural Networks," *Neural Networks*, vol. 13, pp. 407-410 (2000).

Snyders, S., et al., "What Inductive Bias Gives Good Neural Network Training Performance," *Proceedings of the International Joint Conference on Neural Networks*, 8 pages total (2000).

Sugiyama, M., et al., "Incremental Active Learning with Bias Reduction," *Proceedings of the International Joint Conference on Neural Networks*, 6 pages total (2000).

Tetko, I.V., "Associative Neural Network," Internet: <http://cogprints.org/1441/>, pp. 1-15 (2001).

Weiss, S.M., et al., *Predictive Data Mining, A Practical Guide*, pp. 74-78 (1997).

\* cited by examiner

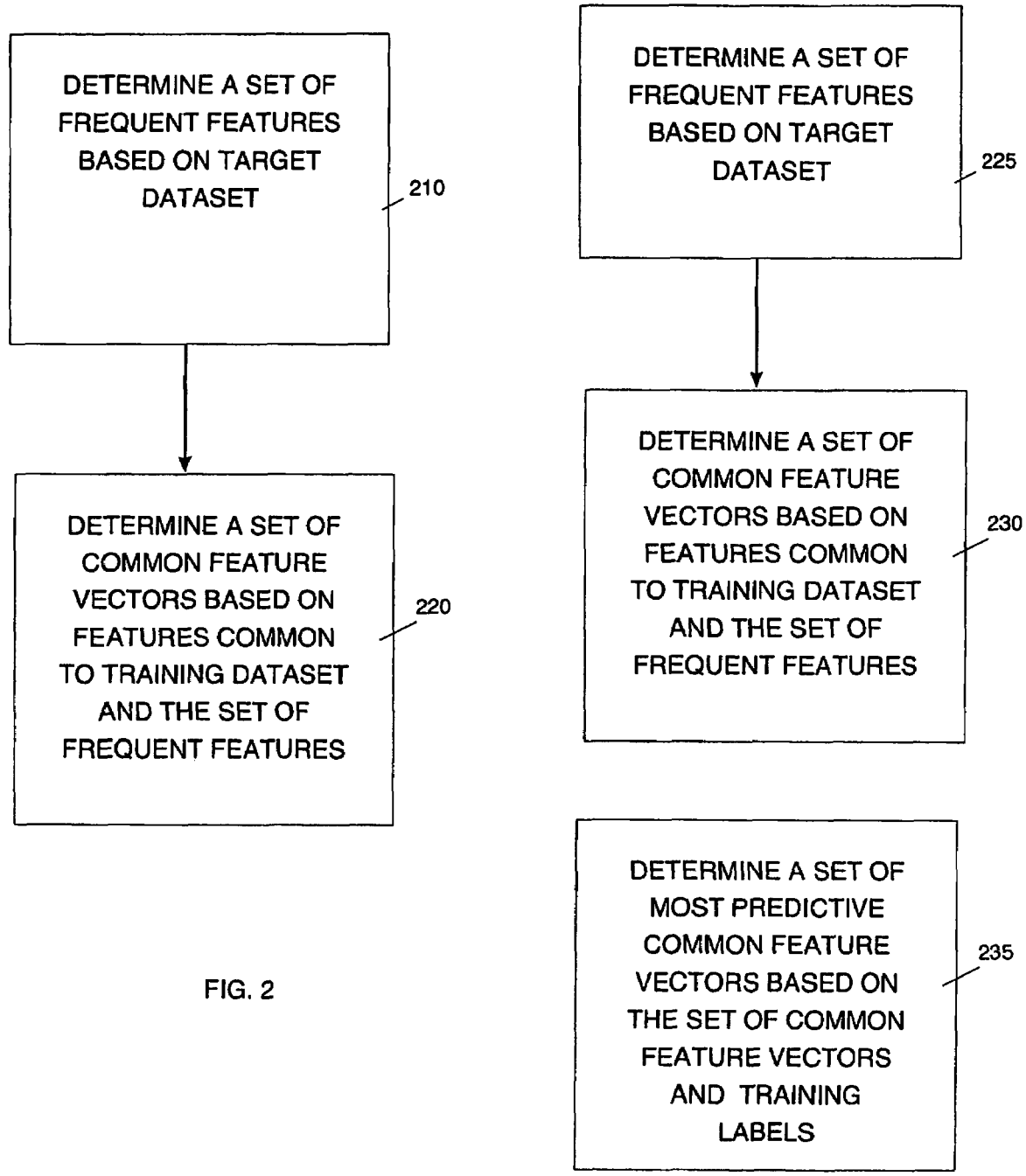

METHOD AND MEDIUM FOR FEATURE SELECTION OF PARTIALLY LABELED DATA

BACKGROUND

1. Field of Technology

The disclosure relates generally to machine learning and classification systems.

2. Glossary

The following definitions are provided merely to help readers generally to understand commonly used terms in machine learning, statistics, and data mining. The definitions are not designed to be completely general but instead are aimed at the most common case. No limitation on the scope of the invention (see claims section, infra) is intended, nor should any be implied.

"Data set" shall mean a schema and a set of "records" matching the schema; A "labeled data set" (or "training data set") has each record explicitly assigned to a class. A single "record" is also sometimes referred to as a "data item," an "example," a "document" or a "case." A "label" is recorded knowledge about which class or data source the record belongs to.

A "feature" is a measurable attribute of a data record. The "feature value" is the specific value of a feature for a given record. For example, the feature representing "whether the word 'free' occurs within the a text record" may have the value 0 or 1. A "feature vector" or "tuple" of a given record is a list of feature values corresponding to a selected list of features describing a given "record." The feature vectors of a whole database often are represented as a matrix. "Feature selection" is a process that involves determining which of the features columns to retain and which to discard.

"Knowledge discovery" shall mean the non-trivial process of identifying valid, novel, potentially useful, and ultimately understandable patterns in data.

"Machine learning" (a sub-field of artificial intelligence) is the field of scientific study that concentrates on "induction algorithms" and other algorithms that can be said to learn; generally, it shall mean the application of "induction algorithms," which is one step in the "knowledge discovery" process.

"Model" shall mean a structure and corresponding interpretation that summarizes or partially summarizes a "data set" for description or prediction.

3. General Background

The volume of machine-readable data that currently is available, for example, on the Internet, is growing at a rapid rate. In order to realize the potentially huge benefits of computer access to this data, the data may be classified into categories (or classes). Traditionally, such data has been classified manually by humans. As the amount of data has increased, however, manual data interpretation has become increasingly impractical. Recently, machine learning has been implemented to classify data automatically into one or more potential classes.

Machine learning encompasses a vast array of tasks and goals. Document categorization, news filtering, document routing, personalization, and the like, constitute an area of endeavor where machine learning may greatly improve computer usage. As one example, when merging with a new company, managers may wish to similarly organize each company's database. Machine learning for text classification is the cornerstone of document categorization, news filtering, document routing and personalization.

"Induction algorithms" (hereinafter "Inducer") are algorithms that take as input specific feature vectors (hereinafter "feature vectors") labeled with their class assignments (hereinafter "labels") and produce a model that generalizes data beyond the training data set. Most inducers generate/build a "model" from a training data set (hereinafter "training data") that can then be used as classifiers, regressors, patterns for human consumption, and input to subsequent stages of "knowledge discovery" and "data mining."

A "classifier" provides a function that maps (or classifies) data into one of several predefined potential classes. In particular, a classifier predicts one attribute of a set of data given one or more attributes. The attribute being predicted is called the label, and the attributes used for prediction are called descriptive attributes (hereinafter "feature vectors"). After a classifier has been built, its structure may be used to classify unlabeled records as belonging to one or more of the potential classes. Many different classifiers have been proposed.

The potential is great for machine learning to categorize, route, filter and search for relevant text information. However, good feature selection may improve classification accuracy or, equivalently, reduce the amount and quality of training data needed to obtain a desired level of performance, and conserve computation, storage and network resources needed for future use of the classifier. Feature selection is a preprocessing step wherein a subset of features or attributes is selected for use by the induction step. Well-chosen features may improve substantially the classification accuracy, or equivalently, reduce the amount and quality of training data items needed to obtain a desired level of performance.

When machine learning is used to build a classifier based on a provided training dataset, but then is used to make predictions on a target dataset that differs somewhat in nature from the training dataset, the classifier produced by machine learning may be poorly suited to the target task. The present invention addresses this problem.

BRIEF DESCRIPTION OF THE DRAWINGS

FIG. 2 is a flow diagram of an exemplary embodiment of a feature selection system of FIG. 1.

FIG. 3 is a flow diagram of another exemplary embodiment of a feature selection system of FIG. 1.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

When machine learning is used to build a classifier based on a provided training dataset and then the classifier is used to make predictions on a target dataset that differs somewhat in nature from the training dataset, the classifier produced by machine learning may be improved by eliminating features from consideration that do not occur in the target dataset or only occur rarely in the target dataset. A training dataset from one domain may be used to build classifiers to be applied to somewhat different target domains.

For example, when two companies merge, an information manager may be required to classify the new company's database (hereinafter "target dataset") into an existing classification scheme. Existing classifiers, already available to the manager, were trained on the parent company's database (hereinafter "training dataset"). Because the two databases may differ in character somewhat, they may be inappropriate for use on the new database.

To accurately classify a database of a newly acquired company having similar products, managers ideally would want to be able to use the existing classifier that has been trained on the parent company's database. However, features that have accurately represented the parent company's database may not work with the merged company's database. In the case of the HP-Compaq merger, for example, the HP classifier had learned that that the word "Jornada" was a good predictive term for the category of "mobile computing" products. However, Compaq's database did not contain the word "Jornada" but used the word "IPAQ" instead to predict the "mobile computing" category. Hence, using the classifier trained on HP's database on the Compaq's database would not accurately classify the Compaq's database. In such new database classification, effective feature selection may be essential to make the learning task more accurate.

The following exemplary embodiments disclose data preparation systems that prepare databases for machine learning, which could yield classifiers that may be used to classify the new database more accurately.

Figure 1:
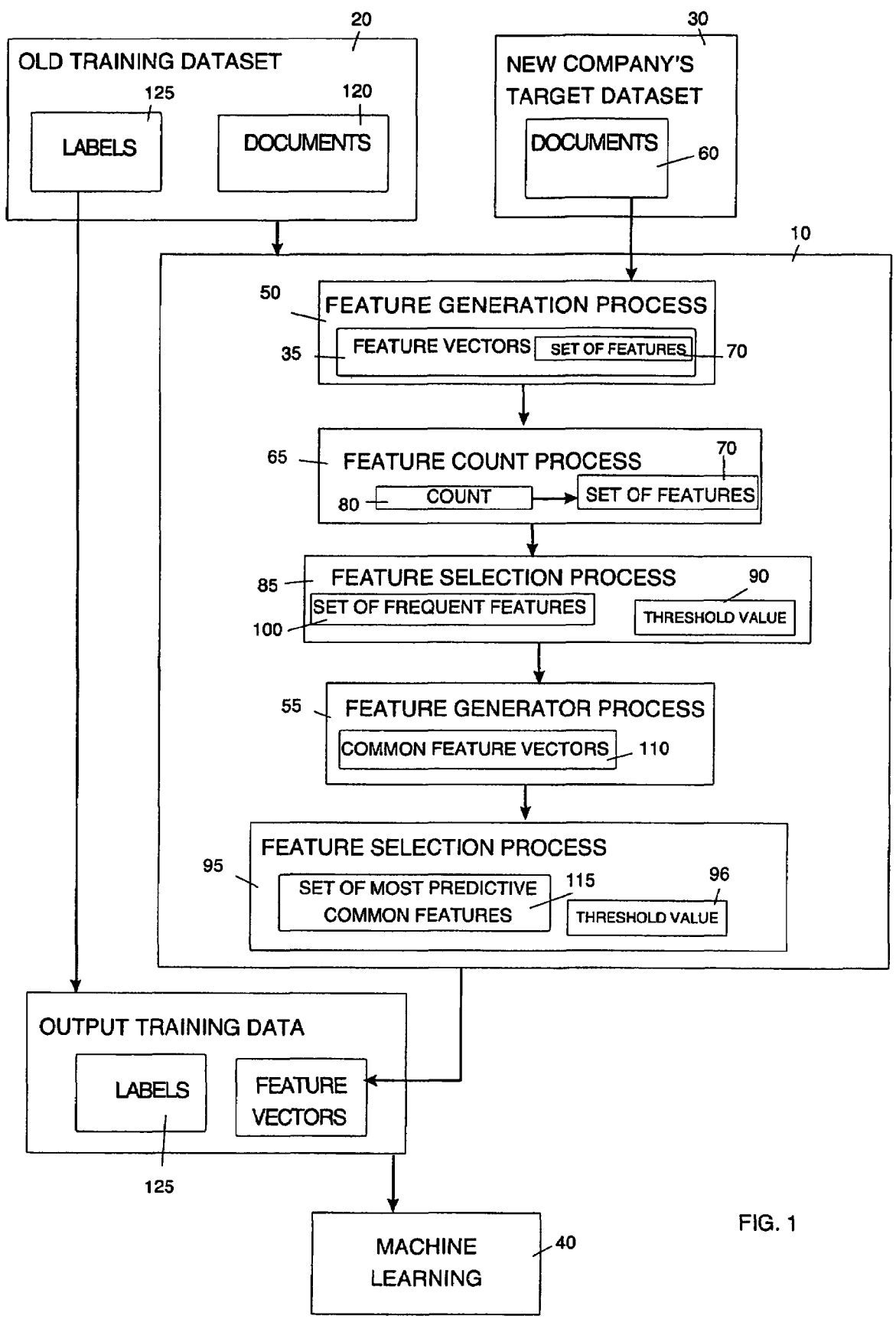
FIG. 1 is a block diagram of an exemplary embodiment of a feature selection system.
Figure 7:
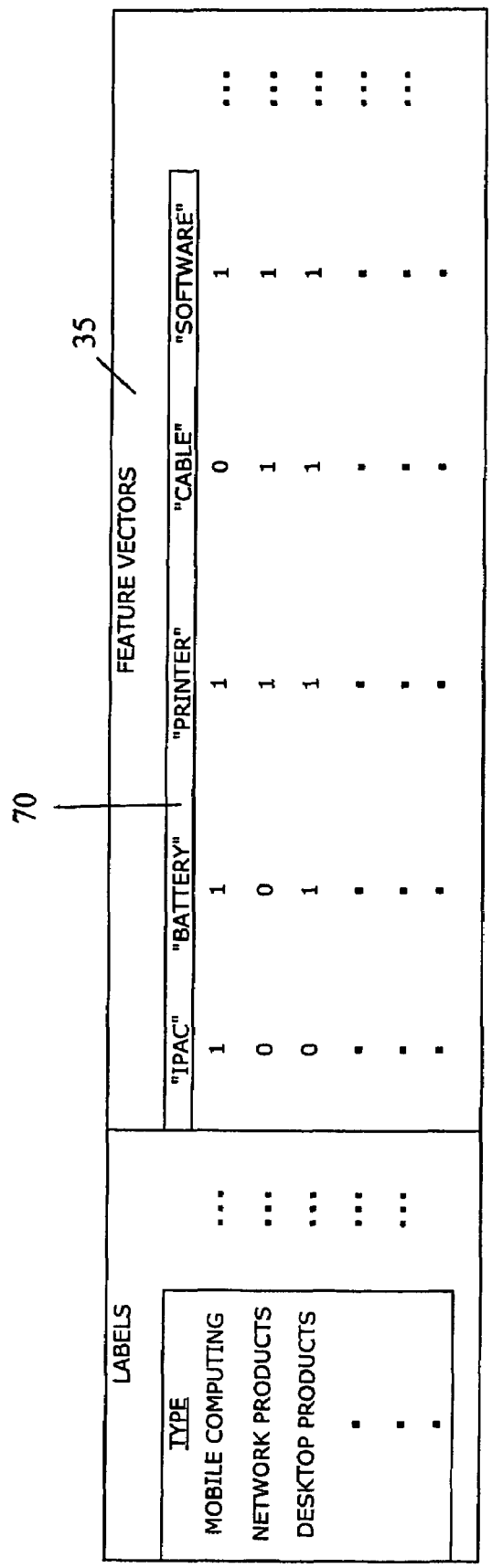
FIG. 7 is a table showing an exemplary modeling of documents from target dataset of FIG. 1.

Referring to FIG. 1, in one exemplary embodiment a data preparation system 10 may prepare a training dataset 20 for a machine learning phase 40 based on documents 60 that make up a target dataset 30. Data preparation system 10 may include feature generation process 50 to determine feature vectors 35, as shown in FIG. 7, with respect to documents 60. As shown in FIG. 7, feature generation process 50 may, for example, generate a set of features 70 within feature vectors 35 by, for example, generating one feature for every word that appears within documents 60. Additionally, the data preparation system 10 may include a feature count process 65 wherein each feature within the set of features 70 may be assigned at least one count 80. Count 80 may represent either how many times that feature occurs in the corpus of documents 60, or in how many individual documents the feature occurs.

Data preparation system 10 may further contain feature selection process 85 to determine a set of frequent features 100 from the set of features 70. Set of frequent features 100 may include features whose count 80 may be equal to or greater than a threshold value 90. The threshold value 90 may be a single number that may be programmable. So, for example, if the threshold value 90 were, for example, to be set to three (3), the set of frequent features 100 would contain features that have a count 80 of three (3) or more. The value of the threshold value 90 is not to be limited by this example. This example is only provided for clarification purposes.

Data preparation system 10 may also include feature generator process 55 to determine a set of common feature vectors 110 based on features that are common to both the set of frequent features 100 and features within documents 120 of the training dataset 20. The features generator process 55 may be preformed by a known-manner algorithm also known as "feature extraction", such as described in "Predictive Data Mining, A Practical Guide" by Shalom M. Weiss and Nitin Indurkhya, pp. 74-78.

Data preparation system 10 may further include feature selection process 95 to determine a set of most predictive common features 115. Feature selection process 95 may follow the feature generation process 55, as shown in FIG. 1, or may be performed within the feature generation process 55 (not shown). The set of most predictive common features 115 may be based on the common feature vectors 110 and the training labels 125. The features selection process 95 may be preformed by a known-manner algorithm, for example, Information Gain algorithm or Bi-Normal Separation algorithm, in which case it may consider the training labels 125 in making its final determination of the set of common feature vectors 110.

Referring to FIGS. 1 and 2, in exemplary operation, a set of most frequent features 100 may be determined based on the documents 60 within the new company's target dataset 30 (step 210). A set of common feature vectors 110 may be determined based on features common to the set of frequent features 100 and features within documents 120 of the training dataset 20 (step 220). Once the set of common feature vectors 110 is determined, the set of common feature vectors 110 may be input to machine learning phase 40. Machine learning phase 40 may perform further feature selection processes not presently shown.

Referring to FIGS. 1 and 3, in another exemplary operation, a set of most frequent features 100 may be determined based on the documents 60 within the new company's target dataset 30 (step 225). A set of common feature vectors 110 may be determined based on features common to the set of frequent features 100 and features within documents 120 of the training dataset 20 (step 230). A set of most predictive common features 115 may be determined based on the training labels 125 and the set of common feature vectors 110 (step 235). Once the set of most predictive common features 115 is determined, the set of most common feature vectors 110 may be thinned out by, for example, removing features that are not within the set of most predictive common features 115 and providing the thinned out set of most common feature vectors 110 for machine learning phase 40.

Referring to FIG. 1, in one exemplary embodiment, a threshold value 96 may be used to determine the number of features to be included within the set of most predictive frequent features 115. The threshold value 96 may be a single number that may be programmable. So, for example, if the threshold value 96 were to be set to two-hundred-one (201), the set of most predictive frequent features 115 would contain two-hundred-one (201) features. The value of the threshold value 96 is not to be limited by this example. This example is only provided for clarification purposes.

Referring to FIG. 1, in another exemplary embodiment the single, programmable threshold value 96 may represent a predictiveness value of the features to be included within the set of most predictive frequent features 115. So, for example, if the threshold value 96 were, for example, set to one-point-four (1.4), the set of most predictive frequent feature vectors 115 would contain features with the predictiveness value of one-point-four (1.4) and above, as may be computed by Information Gain, Bi-Normal Separation, or some other method. The value of the threshold value 96 is not to be limited by this example. This example is only provided for clarification purposes.

Figure 4:
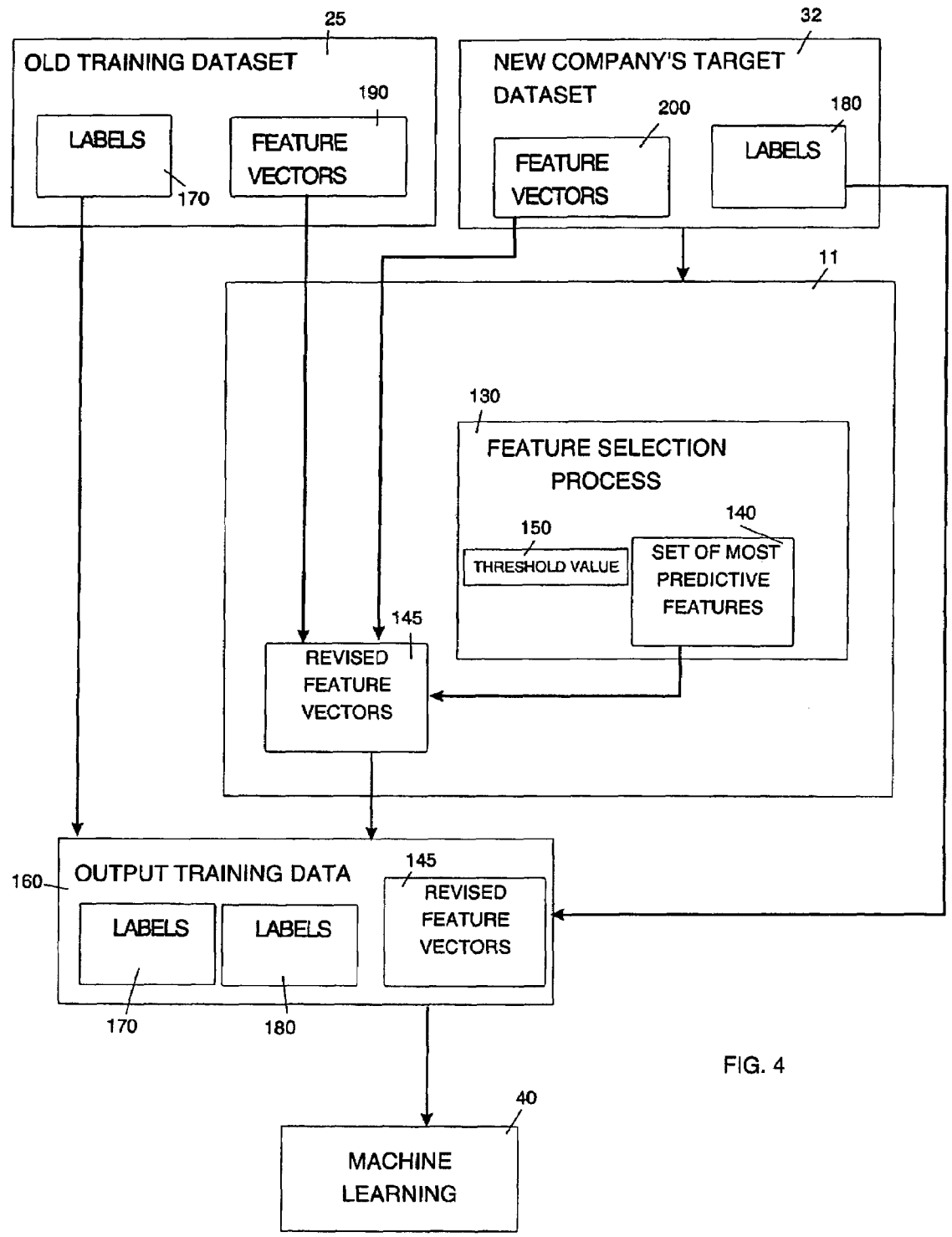
FIG. 4 is a block diagram of an exemplary embodiment of a feature selection system.

Referring to FIG. 4, in another exemplary embodiment, a data preparation system 11 may prepare target dataset 32 and training dataset 25 for machine learning phase 40 based on at least partially labeled target dataset 32. Data preparation system 11 may include feature selection process 130 to determine a set of most predictive features 140 based on the labels 180 and feature vectors 200 within the target dataset 30. Feature selection process 130 may, for example, be implemented through known-manner algorithms, such as Information Gain algorithm or Bi-Normal Separation algorithm.

Figure 5:
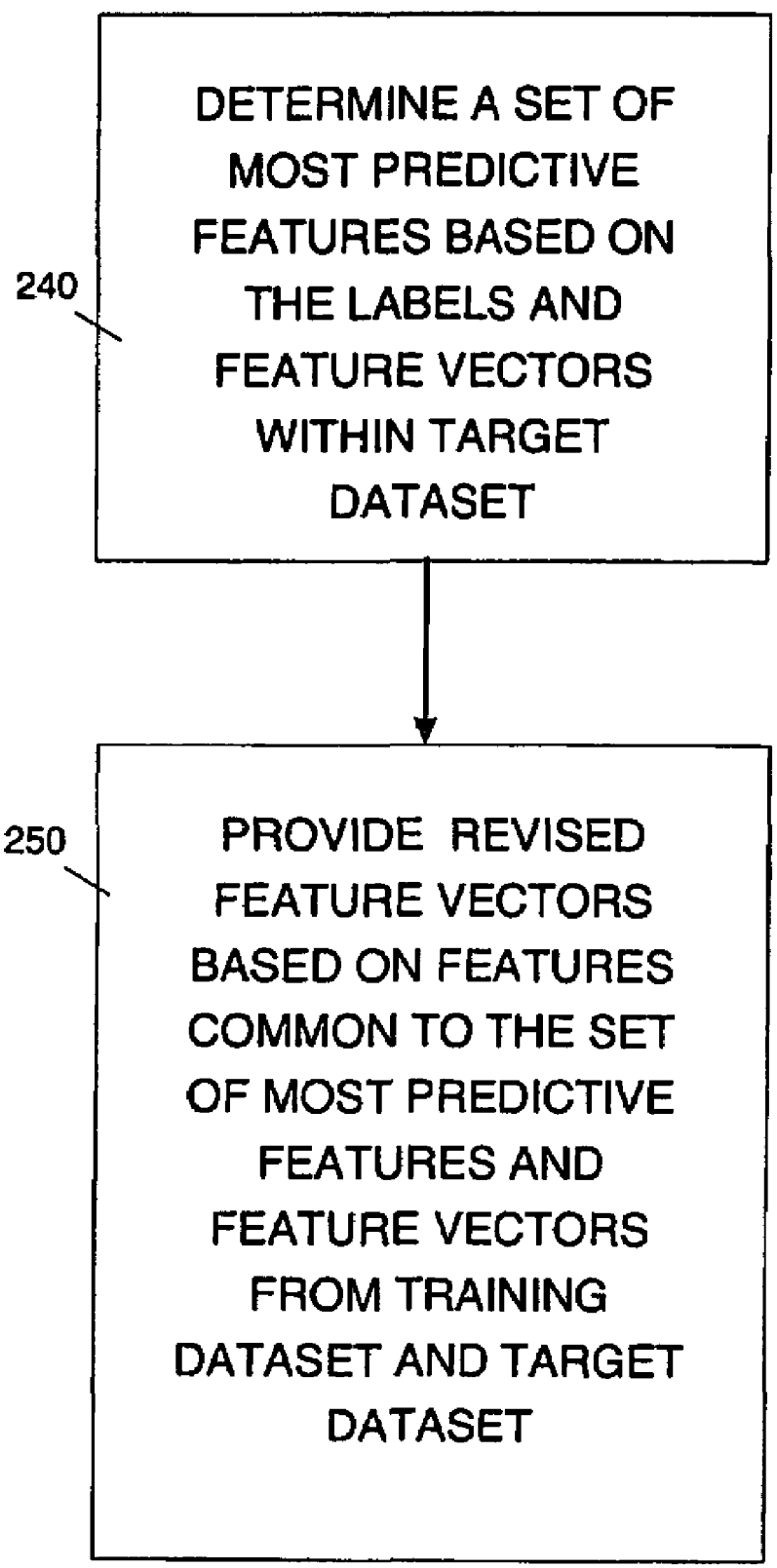
FIG. 5 is a flow diagram of an exemplary embodiment of a feature selection system of FIG. 3.

Referring to FIGS. 4 and 5, in exemplary operation, a set of most predictive features 140 may be determined based on the labels 180 and the feature vectors 200 within the target dataset 30 (step 240). Revised feature vectors 145 may be provided by removing features within feature vectors 190 and 200 that are not within the set of most predictive features 140 (step 250). The revised feature vectors 145 and labels 170 and 180, if any, may make up output training data 160 that may be input to machine learning phase 40. The revised feature vectors 145 may contain features that are common to features within feature vectors 190, 200 and the set of most predictive features 140.

Referring to FIG. 4, in one exemplary embodiment the threshold value 150 may be used to determine the number of features to be included within the set of most predictive features 140. The threshold value 150 may be a single number that may be programmable. So, for example, if the threshold value 150 were to be set to one-hundred-five (105), the set of most predictive features 140 would contain one-hundred-five (105) features. The value of the threshold value 150 is not to be limited by this example. This example is only provided for clarification purposes.

Referring to FIG. 4, in another exemplary embodiment, the single, programmable threshold value 150 may represent a predictiveness value of the features to be included within the set of most predictive features 140. So, for example, if the threshold value 150 were, for example, set to two-point-two (2.2), the set of most predictive features 140 would contain features with the predictiveness value of two-point-two (2.2) and above, as may be computed by Information Gain, Bi-Normal Separation, or some other known manner method. The value of the threshold value 150 is not to be limited by this example. This example is only provided for clarification purposes.

Figure 6:
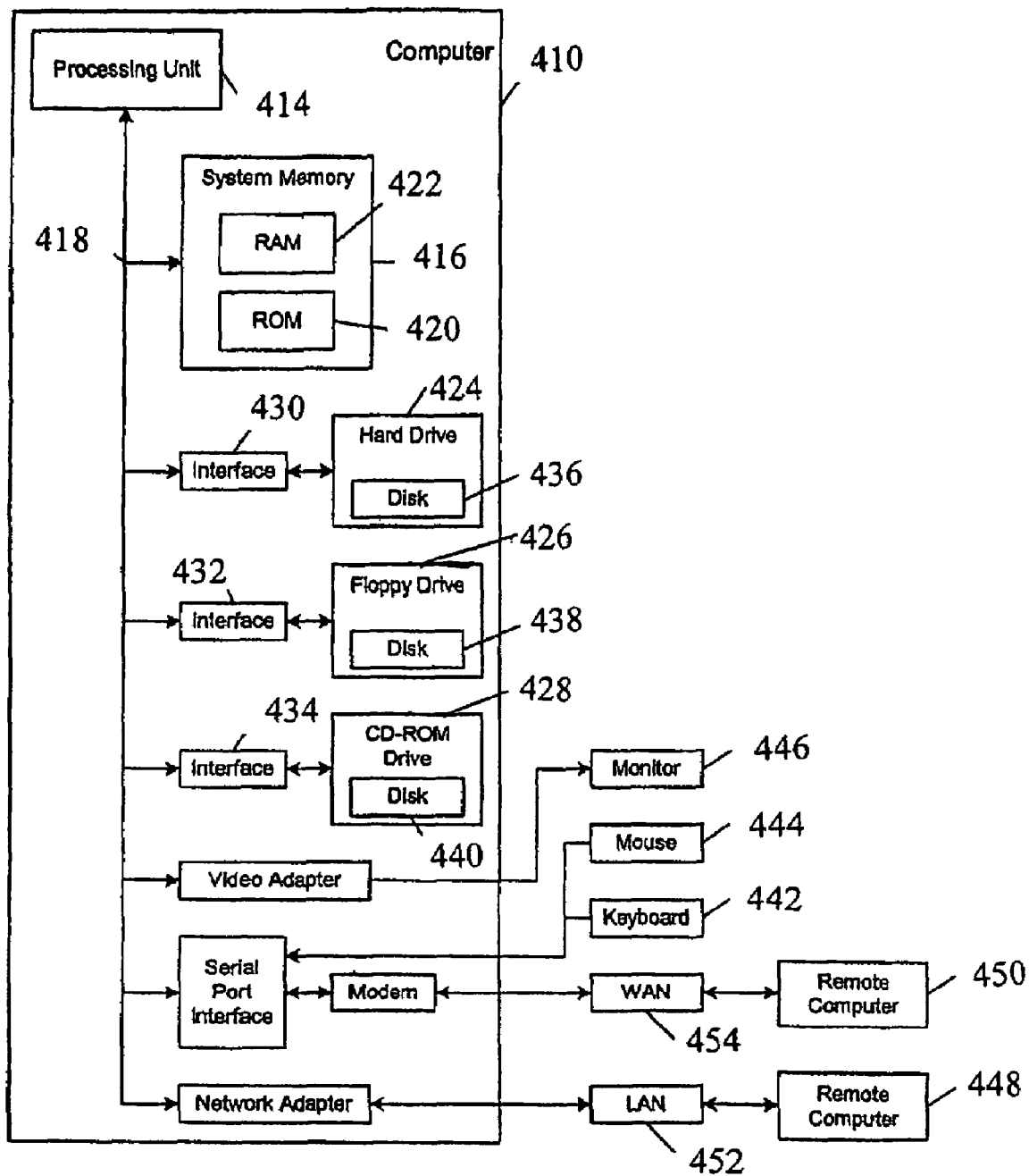
FIG. 6 is a block diagram of a computer on which feature selection system described herein may be performed in accordance with embodiments of the invention.

Referring to FIG. 6, in one exemplary embodiment feature selection systems 10 and 11 may be implemented as one or more respective software modules operating on a computer 410. Computer 410 includes a processing unit 414, a system memory 416, and a system bus 418 that couples processing unit 414 to the various components of computer 410. Processing unit 414 may include one or more processors, each of which may be in the form of any one of various commercially available processors. System memory 416 includes a read only memory (ROM) 420 that stores a basic input/output system (BIOS) containing start-up routines for computer 410, and a random access memory (RAM) 422. System bus 418 may be a memory bus, a peripheral bus or a local bus, and may be compatible with any of a variety of bus protocols, including PCI, VESA, Microchannel, ISA, and EISA. Computer 410 also includes a hard drive 424, a floppy drive 426, and CD ROM drive 428 that are connected to system bus 418 by respective interfaces 430, 432, 434. Hard drive 424, floppy drive 426, and CD ROM drive 428 contain respective computer-readable media disks 436, 438, 440 that provide non-volatile or persistent storage for data, data structures and computer-executable instructions. Other computer-readable storage devices (e.g., magnetic tape drives, flash memory devices, and digital video disks) also may be used with computer 410. A user may interact (e.g., enter commands or data) with computer 410 using a keyboard 442 and a mouse 444. Other input devices (e.g., a microphone, joystick, or touch pad) also may be provided. Information may be displayed to the user on a monitor 446. Computer 410 also may include peripheral output devices, such as speakers and a printer. One or more remote computers 448 may be connected to computer 410 over a local area network (LAN) 252, and one or more remote computers 450 may be connected to computer 410 over a wide area network (WAN) 454 (e.g., the Internet).

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. Other embodiments are within the scope of the claims. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A method for machine learning, comprising:
    obtaining a target dataset that includes a first plurality of feature vectors from a first domain, a subset of which having been assigned a first plurality of labels indicating different classification information for underlying data records;
    determining a set of most predictive features based on the assigned first plurality of labels and the first plurality of feature vectors;
    obtaining a training dataset from a second domain that is different than the first domain, the training dataset including a second plurality of feature vectors and a second plurality of labels;
    revising the first and second plurality of feature vectors based on the set of most predictive features; and
    providing the revised first and second plurality of feature vectors, together with the first and second plurality of labels, to a machine learning process in order to generate a classifier for automatically classifying items within the target dataset.

2. A method according to claim 1, wherein said revising step comprises removing features within the first and second plurality of feature vectors that are not within the set of most predictive features.

3. A method according to claim 1, wherein the set of most predictive features is determined by selecting a specified number of most predictive features.

4. A method according to claim 1, wherein the set of most predictive features is determined based on a threshold predictiveness value of the features to be included.

5. A method according to claim 1, wherein said determining step is performed using at least one of an Information Gain algorithm and a Bi-Normal Separation algorithm.

6. A method according to claim 1, further comprising a step of using the classifier to automatically classify items within the target dataset.

7. A method according to claim 1, further comprising a step of identifying features that are common to the first plurality of feature vectors and the second plurality of feature vectors, and wherein said revising step also is based on said identified common features.

8. A method according to claim 1, wherein said revising step comprises eliminating from consideration features that do not occur, or only occur rarely, in the target dataset.

9. A method according to claim 1, wherein the first domain differs from the second domain in that, for each selected feature from among a plurality of different features, the selected feature has a significantly different level of predictiveness with respect to the same classification category when found in the first domain, as compared to the second domain.

10. A method according to claim 1, wherein the training dataset previously was used to build a previous classifier for classifying records within the second domain.

11. A computer-readable medium storing computer-executable process steps for machine learning, said process steps comprising:
  obtaining a target dataset that includes a first plurality of feature vectors from a first domain, a subset of which having been assigned a first plurality of labels indicating different classification information for underlying data records;
  determining a set of most predictive features based on the assigned first plurality of labels and the first plurality of feature vectors labels;
  obtaining a training dataset from a second domain that is different than the first domain, the training dataset including a second plurality of feature vectors and a second plurality of labels;
  revising the first and second plurality of feature vectors based on the set of most predictive features; and
  providing the revised first and second plurality of feature vectors, together with the first and second plurality of labels, to a machine learning process in order to generate a classifier for automatically classifying items within the target dataset.

12. A computer-readable medium according to claim 11, wherein said revising step comprises removing features within the first and second plurality of feature vectors that are not within the set of most predictive features.

13. A computer-readable medium according to claim 11, wherein the set of most predictive features is determined by selecting a specified number of most predictive features.

14. A computer-readable medium according to claim 11, wherein the set of most predictive features is determined based on a threshold predictiveness value of the features to be included.

15. A computer-readable medium according to claim 11, wherein said determining step is performed using at least one of an Information Gain algorithm and a Bi-Normal Separation algorithm.

16. A computer-readable medium according to claim 11, wherein said process steps further comprise a step of using the classifier to automatically classify items within the target dataset.

17. A computer-readable medium according to claim 11, wherein said process steps further comprise a step of identifying features that are common to the first plurality of feature vectors and the second plurality of feature vectors, and wherein said revising step also is based on said identified common features.

18. A computer-readable medium according to claim 11, wherein said revising step comprises eliminating from consideration features that do not occur, or only occur rarely, in the target dataset.

19. A computer-readable medium according to claim 11, wherein the first domain differs from the second domain in that, for each selected feature from among a plurality of different features, the selected feature has a significantly different level of predictiveness with respect to the same classification category when found in the first domain, as compared to the second domain.

20. A computer-readable medium according to claim 11, wherein the training dataset previously was used to build a previous classifier for classifying records within the second domain.

* * * * *

UNITED STATES PATENT AND TRADEMARK OFFICE
CERTIFICATE OF CORRECTION

PATENT NO. : 7,593,903 B2 Page 1 of 1
APPLICATION NO. : 11/004317
DATED : September 22, 2009
INVENTOR(S) : George H. Forman et al.

It is certified that error appears in the above-identified patent and that said Letters Patent is hereby corrected as shown below:

In column 7, line 40, in Claim 11, delete "vectors labels;" and insert -- vectors; --, therefor.

Signed and Sealed this

Twenty-ninth Day of June, 2010

David J. Kappos
*Director of the United States Patent and Trademark Office*